Reissued Oct. 17, 1922. M. RIESNER. 15,472.

AUTOMATIC PLATE VALVE.

APPLICATION FILED JULY 26, 1922

Inventor:
Michael Riesner
by his Attys:
Philipp, Sawyer, Rice & Kennedy

Reissued Oct. 17, 1922. Re. 15,472

UNITED STATES PATENT OFFICE.

MICHAEL RIESNER, OF CINCINNATI, OHIO, ASSIGNOR TO WORTHINGTON PUMP AND MACHINERY CORPORATION, A CORPORATION OF VIRGINIA.

AUTOMATIC PLATE VALVE.

Original application filed April 13, 1920, Serial No. 373,609. Renewed March 2, 1922, Serial No. 540,613. Original No. 1,417,690, dated May 30, 1922. Application for reissue filed July 26, 1922. Serial No. 577,879.

*To all whom it may concern:*

Be it known that I, MICHAEL RIESNER, a citizen of the United States, residing at Cincinnati, county of Hamilton, State of Ohio, have invented certain new and useful Improvements in Automatic Plate Valves, fully described and represented in the following specification and the accompanying drawings, forming a part of the same.

This invention relates especially to valve constructions of the type generally set forth in the reissue patent to Meyer, No. 13,991, August 2, 1915, that is to say, valves consisting of thin elastic strips of metal which are so held at their ends that, when under fluid pressure, they bend at their centers towards and away from their ports to open and close the same.

The present invention has for its especial object to produce a construction employing valves of the type referred to, which shall be cheap to construct, which shall be efficient in operation and which presents advantages in the matter of assembling the construction.

With these and other objects not particularly referred to in view, the invention consists in certain constructions, and in certain parts, improvements and combinations, as will be hereinafter fully described and then specifically pointed out.

Referring to the drawing—

Figure 1 represents a vertical section of a part of the compressor embodying the improved construction;

Figures 2 and 3 are sections on the lines 2—2 and 3—3, respectively, of the construction shown in Fig. 1;

Figure 1:
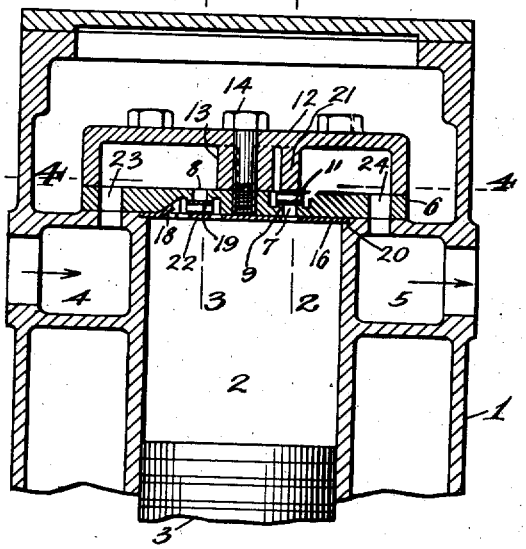
Figure 2:
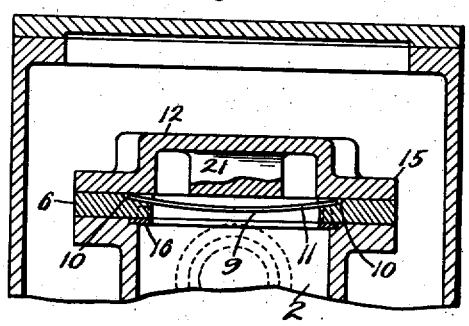

Referring to the drawings which illustrate a concrete embodiment of the invention, 1 indicates a compressor casing having a compressor chamber or cylinder 2 in which works a piston 3, the compressor having inlet and outlet chambers and ports 4 and 5. The compressor chamber or cylinder is closed by a port plate 6 having cylinder ports 7 and 8 formed therein. In the construction illustrated, the port 7 is formed at the bottom of a recess in the outer side of the plate, and, in the construction shown, is less in length and width than the recess, with the result that shoulders 9, which constitute a valve seat, are formed at the sides of the port, and valve supports 10 are formed at the ends of the port. In what are regarded as the best constructions, these shoulders 9 and valve supports 10 are formed on a curve which dips toward the transverse center of the port. The port 8 is formed at the bottom of a recess cut in the inner side of the port plate 6 and this port, in the construction shown, is also less in length and width than the recess, so as to form shoulders which constitute a seat for the valve and supports on which the valve rests at its ends, the seat and support also being formed on a curve.

The valve consists of thin elastic strips 11 and 19 of metal which when properly held at their ends will flex at their centers to open and close the ports. Where the specific construction of inclined seats and supports, such as herein shown, are employed, the valve strips will be formed on a curve which corresponds to the curve of the seats and shoulders. This may readily be accomplished by passing the valve strips through rolls which give them a set, so that they have the curve referred to.

Means are provided for holding or confining the valve strips at their ends so as to leave them free to flex at the centers to open and close in the manner characteristic of valves of the type referred to. While these may vary, in the particular construction shown, for the valve strip 11 a cap 12 is provided, this cap having an inwardly projecting boss 13 through which passes a screw 14, this screw being threaded into plate 6 and holding the parts together. This cap has side flanges 15 which overlie the ends of the recess in which the port 7 is formed, and, consequently, overlie the valve supports 10. The ends of the valve strip are, therefore, so held between the supports and these flanges that the valve strip 11 is free to flex and will thus move towards and away from its port to open and close the same.

Figure 3:
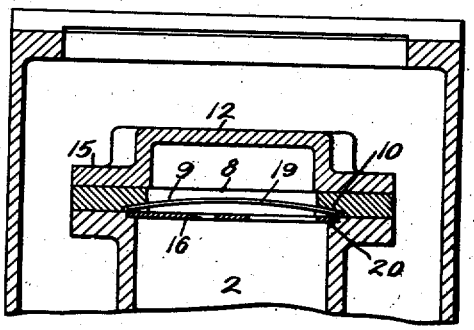
Figure 4:
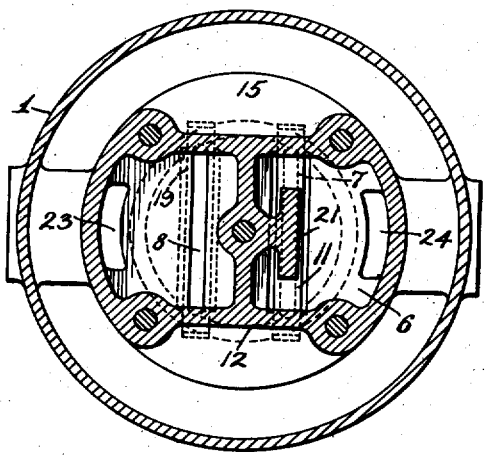
Figure 4 is a horizontal section on the line 4—4 of Fig. 1.
Figure 5:
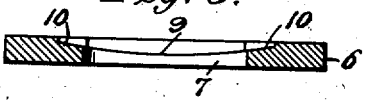
Figures 5, 6 and 7 are detail views.
Figure 6:
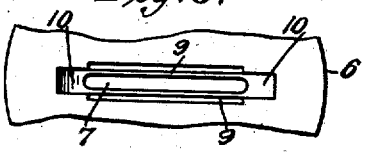
Figure 7:
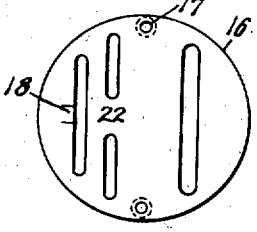

In the particular construction illustrated, for the valve strip 19 there is provided a slotted guard plate 16 which is located between the port plate 6 and the compressor chamber, this plate being secured to the port plate by screws which pass through holes 17 in the guard plate and into the port plate. If desired, this guard plate may be provided with a positioning rib, as 18, which takes into a recess in the port plate 6, so that in assembling the screw holes 17 may be brought accurately into register with the corresponding screw holes in the port plate. The edge of this guard plate, as shown in Fig. 3, for instance, overlies the ends of the recess in which the port 8 is located, and the valve supports in said recess. This guard plate, therefore, which may, as shown, be located on a shoulder, as 20, formed at the end of the compressor chamber, assists in holding the valve strip 19 at its ends but permits it to flex to open and close its ports.

If desired, means may be provided for limiting the flexing movement of the valve strips 11 and 19. While these means may be varied, in the particular construction shown, the cap 12 has a downwardly projecting rib 21 against which the valve strip 11 will abut when it is opened to the desired extent. As shown, the opening or flexing movement of the valve strip 19 is limited by an integral section 22 between the slots of the guard plate 16, this section being so positioned that the valve 19 will abut against it when it is opened to the desired extent. As shown, the port plate 6 is provided with inlet and outlet ports 23, 24 which communicate with the inlet and outlet ports 4, 5 and lead into the chamber formed in the cap 12.

It will be understood that with the construction as described, the port plate, the valves, the cap and the guard plate can be easily assembled, and that the recesses in which the thin flexible valve strips are located permit the same to be positioned in the structure during assembly without danger that they will become displaced while the rest of the parts are being put in position.

It will be understood that changes and variations may be made in the construction herein shown and described without departing from the invention, and that the invention claimed is not confined to such construction. While the invention relates especially to valves of the type above described, in which the valve plates flex for opening and closing the ports, my improved port plate arrangement may be used with plate valves of other types and is thus claimed.

What is claimed is:

1. The combination with a curved valve seat having valve supports at its ends, of a thin, flexible, normally curved plate valve cooperating with said seat to open and close a port therethrough, the ends of the valve normally resting freely on said supports, the valve flexing during this opening and closing movement and its ends being free to permit said flexing.

2. The combination with a valve seat having valve supports at its ends formed on a curve which dips toward the center of the port formed through the seat, of a thin normally curved plate valve cooperating with said seat to open and close the port therethrough, the ends of the valve normally resting freely on said supports, the valve flexing during this opening and closing movement and its ends being free to permit said flexing.

3. A port plate having a recess therein, a port cut through its bottom of less length than the recess, whereby valve supports are formed at the ends of the port which are below the surface of the plate, a thin flexible valve strip the ends of which normally rest freely on said supports, and means for confining the strip at its ends on said supports thereby leaving the valve free to flex to open and close the port.

4. A port plate having a recess therein, a port cut through the bottom of the recess of less length than the recess, whereby valve supports are formed at the ends of the port which are below the surface of the plate, said valve supports being inclined toward the center of the port, a normally curved thin flexible valve strip the ends of which normally rest freely on said supports, and means for confining the strip at its ends on said supports, thereby leaving the valve free to flex to open and close the port.

5. A port plate having a recess therein, a port cut through the bottom of the recess of less length and width than the recess, whereby shoulders which constitute a valve seat are formed at the sides of the port and valve supports are formed at the ends of the port, a thin flexible valve strip the ends of which normally rest freely on said supports, and means for confining the valve at its ends on said supports, thereby leaving it free to flex to open and close.

6. A port plate having a recess therein, a port of less length and width than the recess cut through the bottom of the recess, whereby shoulders which constitute a valve seat are formed at the sides of the port and valve supports are formed at the ends of the port, said shoulders and supports being formed on a curve which dips toward the center of the port, a normally curved thin flexible valve strip the ends of which normally rest freely on said supports, and means for confining the valve at its ends on said supports thereby leaving it free to flex to open and close.

7. A port plate having a recess therein, a port of less length than the length of the recess cut through the bottom of the recess, whereby valve supports are formed at the ends of the port which are below the surface of the plate, a thin flexible valve strip the ends of which normally rest freely on said supports, means for confining the valve at its ends on said supports, thereby leaving it free to flex to open and close, and means for determining the opening movement of the valve.

8. A port plate having a recess therein, a port of less length and width than the recess cut through the bottom of the recess, whereby shoulders which constitute a valve seat are formed at the sides of the port, and valve supports are formed at the ends of the port, a thin flexible valve strip the ends of which normally rest freely on said supports, means for confining the valve at its ends on said supports, thereby leaving it free to flex to open and close, and means for determining the opening movement of the valve.

9. A port plate having a recess therein, a port of less length and width than the recess cut through the bottom of the recess, whereby shoulders which constitute a valve seat are formed at the sides of the port and valve supports are formed at the ends of the port, said shoulders and supports being formed on a curve which dips toward the center of the port, a normally curved flexible valve strip the ends of which normally rest freely on said supports, means for confining the valve strips at its ends on said supports, whereby it is left free to flex to open and close, and means for determining the opening movement of the valve.

10. The combination with a cylinder and its piston, of a port plate having recesses in opposite sides thereof, ports of less length and width than the recesses cut through the bottom, whereby shoulders which constitute a valve seat are formed at the sides of the ports, and valve supports are formed at the ends of the ports, said supports and shoulders being formed on a curve which dips toward the center of the ports, normally curved flexible valve strips the ends of which normally rest freely on said supports, and means for confining the valve strips at their ends, thereby leaving them free to flex to open and close.

11. The combination with a cylinder and its piston, of a port plate having recesses in opposite sides thereof, ports less in length and width than the recesses cut through the bottoms thereof, whereby shoulders which constitute a valve seat are formed at the sides of the ports, and valve supports are formed at the ends of the ports, said supports and shoulders being formed on a curve which dips toward the center of the ports, normally curved flexible valve strips the ends of which normally rest freely on said supports, means for confining the valve strips at their ends, thereby leaving them free to flex to open and close, and means for determining the opening movement of the valve strips.

12. The combination with a cylinder and its piston, of a port plate having recesses in opposite sides thereof, ports of less length and width than the recesses cut through the bottoms thereof, whereby shoulders which constitute valve seats are formed at the sides of the ports and valve supports at the ends of the ports, said supports and seats being formed on a curve which dips toward the center of the ports, flexible valve strips on the supports, a slotted guard plate between the port plate and the chamber in the cylinder, said plate confining the valve strip on the inner side of the plate port to the supports but leaving it free to flex to open and having a section which determines the opening movement of the valve strip, and a cap covering the port plate, said cap confining the end of the valve strip in the recess on the outer side of the plate to its supports and having a rib which determines the opening movement of the valve strip.

13. A port plate having a recess therein, a port cut through the bottom of the recess of less length and width than the recess, whereby shoulders which constitute a valve seat are formed at the sides of the port and valve supports are formed at the ends of the port, a valve strip the ends of which normally rest freely on said supports, and means for confining the valve at its ends on said supports.

14. A port plate having a recess therein, a port of less length than the length of the recess cut through the bottom of the recess, whereby valve supports are formed at the ends of the port which are below the surface of the plate, a valve strip the ends of which normally rest freely on said supports, means for confining the valve at its ends on said supports, and means for determining the opening movement of the valve.

15. A port plate having a recess therein, a port of less length and width than the recess cut through the bottom of the recess, whereby shoulders which constitute a valve seat are formed at the sides of the port and valve supports are formed at the ends of the port, a valve strip the ends of which normally rest freely on said supports, means for confining the valve at its ends on said supports, and means for determining the opening movement of the valve.

16. The combination with cylinder 2, of guard plate 16 on the cylinder head having inlet and exhaust ports, port plate 6 outside said guard plate having inlet and exhaust ports and valve seats, and plate valves 11, 19 seating on said seats within the opposite faces of the plate.

17. A valve seat having a concave surface, a normally curved plate valve of thin elastic material seating on said concave surface, and means for loosely confining said valve while permitting flexing in the direction tending to straighten the valve in opening.

18. A valve seat having a concave surface, a normally curved plate valve of thin elastic material seating on said concave surface, and a cap loosely confining the valve to permit flexing in the direction tending to straighten the valve in opening and limiting the opening movement of the valve.

19. An automatic plate valve, comprising a valve seat, and a thin flexible normally curved plate valve cooperating with said seat to open and close a port therethrough, the valve being loosely mounted to permit uniform flexing of the valve during the opening and closing movements.

20. An automatic plate valve, comprising a seat having a port, a guard having a port, and a permanently flexed plate valve interposed between said seat and guard.

21. An automatic plate valve, comprising a seat having a port, a guard having a port, and an elongated permanently flexd plate valve curved in the direction of its length and interposed between said seat and guard.

In witness whereof I hereunto affix my signature.

MICHAEL RIESNER.